US007866531B2

(12) United States Patent
Yang et al.

(10) Patent No.: US 7,866,531 B2
(45) Date of Patent: Jan. 11, 2011

(54) MULTI-SHEET STRUCTURES AND METHOD FOR MANUFACTURING SAME

(75) Inventors: Qi Yang, Farmington Hills, MI (US); Harsha Badarinarayan, Novi, MI (US); Frank Hunt, West Bloomfield, MI (US); Kazutaka Okamoto, Novi, MI (US)

(73) Assignee: Hitachi, Ltd, Tokyo (JP)

( * ) Notice: Subject to any disclaimer, the term of this patent is extended or adjusted under 35 U.S.C. 154(b) by 498 days.

(21) Appl. No.: 11/930,838

(22) Filed: Oct. 31, 2007

(65) Prior Publication Data

US 2009/0110949 A1 Apr. 30, 2009

(51) Int. Cl.
*B23K 31/02* (2006.01)

(52) U.S. Cl. .................................................. 228/112.1

(58) Field of Classification Search .............. 228/112.1
See application file for complete search history.

(56) References Cited

U.S. PATENT DOCUMENTS 3,319,322 A * 5/1967 Anderson ............. 29/890.042
3,981,753 A 9/1976 Hopper
4,603,089 A 7/1986 Bampton
5,449,109 A 9/1995 Chuang et al.
5,692,881 A 12/1997 Leibfried
5,994,666 A 11/1999 Buldhaupt et al.
6,168,072 B1 1/2001 Schwartz et al.
6,264,880 B1 7/2001 Elmer et al.
6,656,603 B2 12/2003 Buldhaupt et al.
6,677,011 B2 1/2004 Elmer et al.
6,820,796 B2 11/2004 Sanders
7,048,175 B2 * 5/2006 Runyan .................. 228/112.1
7,141,206 B2 11/2006 Ishikawa et al.
7,146,727 B2 12/2006 Kistner et al.
2005/0127145 A1 6/2005 Czaplicki et al.
2006/0255098 A1 11/2006 Runyan

FOREIGN PATENT DOCUMENTS

GB 9125978.8 12/1991

OTHER PUBLICATIONS

European Search Report dated Jan. 20, 2009, EP 08 01 9131.

* cited by examiner

*Primary Examiner*—Jessica L Ward
*Assistant Examiner*—Nicholas P D'Aniello
(74) *Attorney, Agent, or Firm*—Gifford, Krass, Sprinkle, Anderson & Citkowski, P.C.

(57) ABSTRACT

A method for fabricating multi-sheet structures in which a first sheet is arranged on a planar support and a blowing agent is placed on at least one selected portion of the first sheet. A second sheet is positioned over the first sheet so that the second sheet overlies the selected portion of the first sheet and the first and second sheets are then secured together by friction stir welding in a pattern which encloses the selected portion of the first sheet. Additional sheets may be secured together in a like fashion. Thereafter, the sheets are heated to a temperature sufficient to decompose the blowing agent.

8 Claims, 2 Drawing Sheets

MULTI-SHEET STRUCTURES AND METHOD FOR MANUFACTURING SAME

BACKGROUND OF THE INVENTION

I. Field of the Invention

The present invention relates generally to multi-sheet structures and methods for manufacturing such multi-sheet structures.

II. Description of Related Art

There have been previously known multi-sheet metal structures in which a first and second metal sheet are positioned together so that the second sheet overlies at least a portion of the first sheet. A blowing agent is contained with one or more selected potions between the first and second sheet and the first and second sheet are then joined together to form a continuous joint which encloses the selected portion containing the blowing agent. Joining techniques include welding, diffusion bonding, adhesive bonding and the like. Thereafter, the now attached first and second sheets are heated to a temperature which exceeds the decomposition temperature of the blowing agent so that the first and second sheets expand outwardly from each other in the selected portion containing the blowing agent. Oftentimes, the first and second sheets are positioned within a mold during the heating step so that the mold defines the final shape of the structure.

These previously known multi-sheet metal structures, however, have suffered from certain limitations such as need for dedicated surface pretreatments including removal of contamination and surface oxide are required prior to joining metal sheets. In addition, sheet surfaces to be welded must fit up accurately prior to joining. Welds made by other welding techniques (such as laser welding and electron beam welding) typically suffer from the fact that due to the melting of the base material and high cooling rates, the weld becomes brittle and weak and is also prone to stress concentration. This change in metallurgical property significantly affects the ability of the sheet to be formed when the blowing agent decomposes. Some prior joining techniques (such as diffusion bonding) require lengthy processing time to join the multiple sheets as opposed to friction stir welding which requires only a few minutes. Furthermore, it is imperative that during the thermal welding step that the blowing agent not decompose until the thermal weld is completed. Consequently, in order to avoid premature decomposition of the blowing agent during the welding operation, it has been previously necessary to form a weld at a relatively large distance away from the blowing agent or otherwise take steps to ensure that the blowing agent remains below its decomposition temperature during the welding operation. This, in turn, limits the type of structures that may be manufactured.

A still further disadvantage to the previously known methods for fabricating multi-sheet metal structures which utilize blowing agents, is that it is difficult to fabricate structures having three or even more sheets in which the weld pattern between the first and second sheet differs from the weld pattern between the second and third sheet. This difficulty arises primarily since it is difficult to control the depth of the thermal welding between only two of the three sheets.

SUMMARY OF THE INVENTION

The present invention provides a multi-sheet metal structure and method for making a metal structure which overcomes all of the above-mentioned disadvantages of the previously known devices and methods.

In brief, in the method of the present invention, a first metal sheet is positioned on a planar support and a blowing agent is positioned on at least one selected portion of the first sheet, and more typically, multiple selected portions. The blowing agent may be comprised of any conventional blowing agent, such as titanium hydride powder, magnesium hydride powder, and the like.

A second metal sheet is then positioned over the first sheet so that the second sheet overlies the selected portion or portions of the first sheet containing the blowing agent. Thereafter, the first and second sheets are secured together by friction stir welding in a pattern which encloses each selected portion containing the blowing agent between the first and second sheet. Following completion of the friction stir welding, the now attached first and second sheets are heated to a temperature which exceeds the decomposition temperature of the blowing agent thus causing the first and second sheet to expand outwardly away from each other in each of the selected portions containing the blowing agent. This heating step may be conducted in a mold which defines the shape of the final metal structure.

Since the depth of the friction stir weld may be carefully and closely controlled, the present invention enables metal structures having three or even more sheets. For example, in a three sheet metal structure, after the first and second sheet have been secured together as described above, a blowing agent is provided on selected portion or portions of the exposed sides of either the first or second sheet. Thereafter, a third sheet is positioned over the exposed side of the first or second sheet and secured to the exposed side by friction stir welding which totally encloses each selected portion containing the blowing agent. Furthermore, since the depth of the friction stir weld may be carefully controlled, the weld pattern between the first and second sheet may be both offset and interlaced with the pattern between the third sheet and the exposed side of either the first or the second sheet without premature decomposition of the blowing agent.

BRIEF DESCRIPTION OF THE DRAWINGS

A better understanding will be had upon reference to the following detailed description when read in conjunction with the accompanying drawings, wherein like reference characters refer to like parts throughout the several views, and in which.

DETAILED DESCRIPTION OF THE PREFERRED EMBODIMENTS

Figure 1:
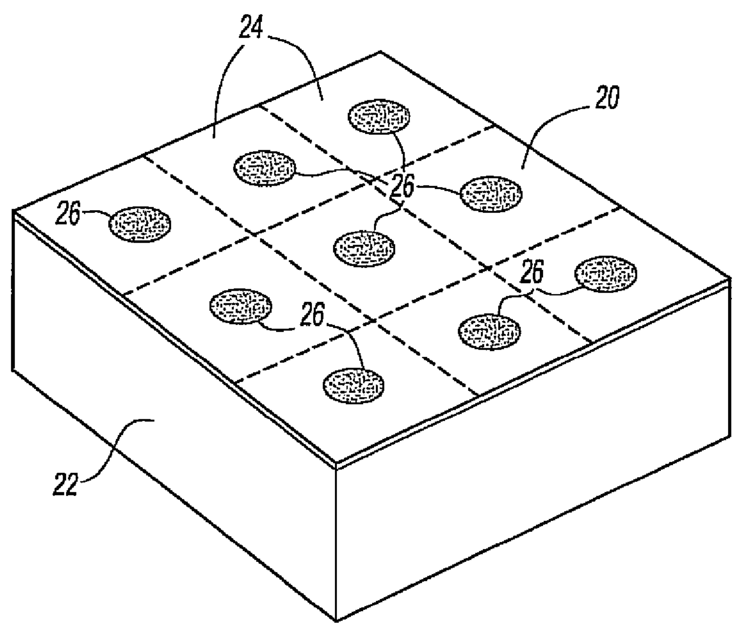
FIG. 1 is an elevational view illustrating initial steps of the method of the present invention.

With reference first to FIG. 1, in order to manufacture the multi-sheet metallic structure of the present invention, a first metal sheet 20 is arranged on a planar support 22. The metal sheet 20 is preferably planar and an upper surface of the planar support 22 is preferably horizontal. Furthermore, the sheet 20 may be constructed of any metal alloy or material, such as aluminum.

Still referring to FIG. 1, for exemplary purposes only, the metal sheet 20 is illustrated as having nine different selected portions 24 arranged in a three-by-three grid. It will be understood, of course, that the three-by-three grid for the selected portions 24 is by way of example only and that any pattern may be utilized without deviation from the spirit or scope of the invention.

A blowing agent 26 is positioned within each of the selected areas 24. Any conventional blowing agent, such as titanium hydride powder or magnesium hydride powder, may be employed.

Figure 2:
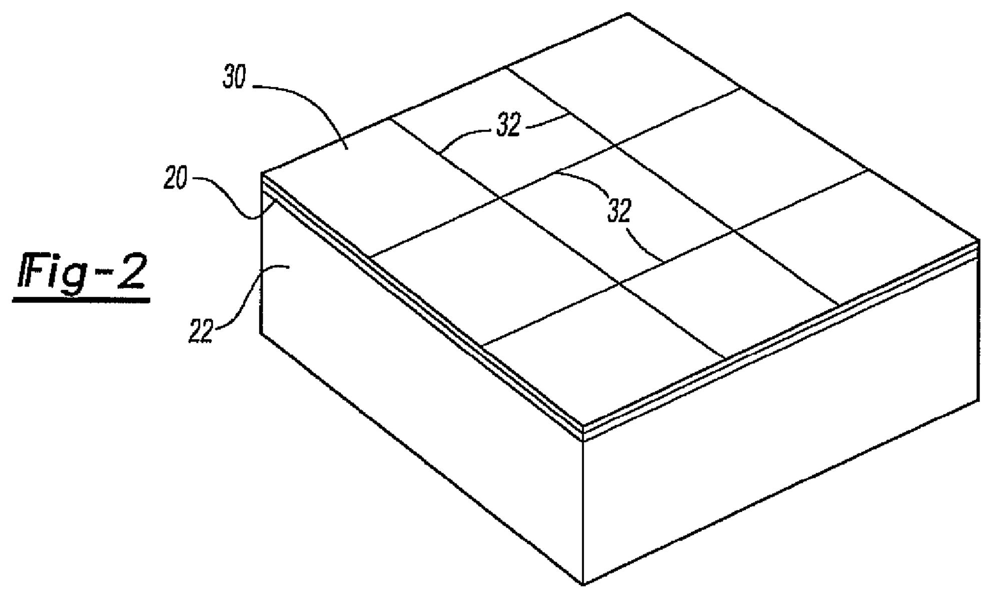
FIG. 2 is a view similar to FIG. 1, but illustrating further steps of the method of the present invention.

With reference now to FIG. 2, a second sheet 30 is then positioned over the first sheet 20, such that the second sheet 30 overlies each of the selected portions 24 (FIG. 1) on the first sheet 20. Thereafter, the first sheet 20 and second sheet 30 are secured together by friction stir welding, thus forming friction stir welds 32 which enclose each of the selected portions 24 on the first sheet 20. The friction stir weld 32, furthermore, is continuous and fully encloses each of the selected portions 24 on the first sheet and thus effectively seals the blowing agent 26 contained within each selected portion 24 between the first sheet 20 and second sheet 30.

Figure 3:
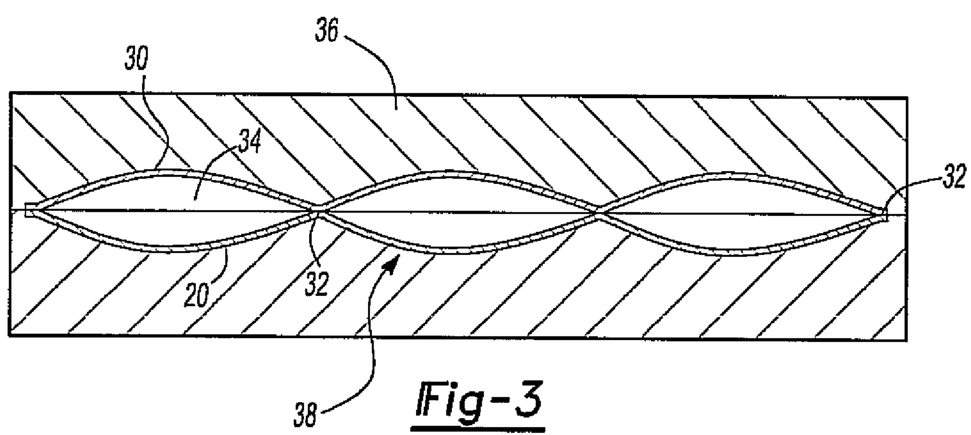
FIG. 3 is a side sectional view illustrating yet a further step of the method of the present invention.

With reference now to FIG. 3, the blowing agent is heated to a temperature sufficient to decompose the blowing agent, e.g. by heating the now attached first sheet 20 and second sheet 30 to a temperature sufficient to decompose the blowing agent. In doing so, the blowing agents decompose to form hydrogen gas which causes the sheets 20 and 30 to expand outwardly from each other in each of the selected areas thus forming pockets 34 between the sheets 20 and 30. This heating of the first and second sheets 20 and 30, furthermore, may be carried out within a mold 36 which defines the shape of the final metal structure 38 following the heating step. The mold 36 may be flat or shaped as shown in FIG. 3. The shape of the mold determines the shape of the final expanded metal structure.

Figure 4:
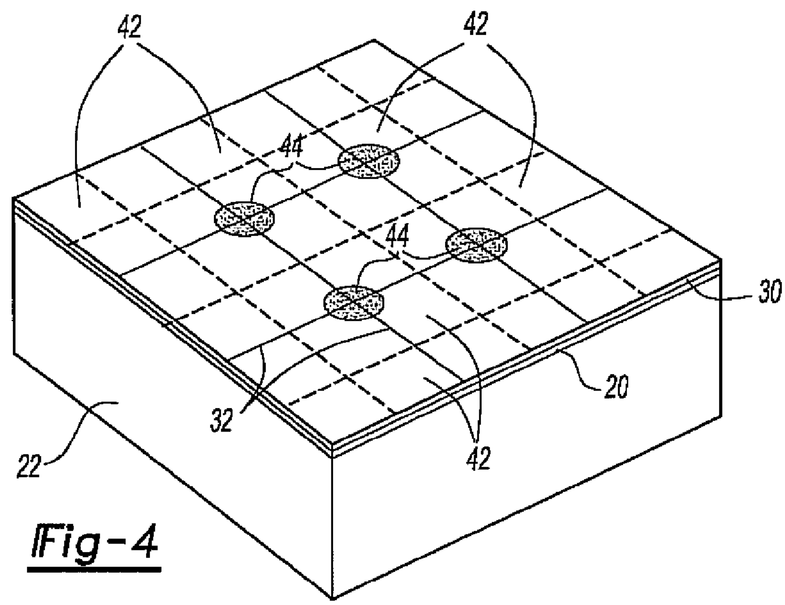
FIG. 4 is a view similar to FIG. 1, but illustrating a modification thereof.

With reference now to FIG. 4, the present invention also enables multi-sheet metal structures having three or even more sheets. For example, after the completion of the friction stir welding operation shown in FIG. 2, the upper side of the second sheet 30 is exposed. This exposed side of the sheet 30 is then divided into a pattern indicated in phantom lines which thus divide the exposed side of the second sheet 30 into a plurality of selected portions 42. These selected portions 42 are illustrated in FIG. 4 as a grid in which the center of each selected portion 42 is centered on intersecting weld lines 32 from the friction stir welding operation between the first sheet 20 and second sheet 30. It will, of course, be understood that this is by way of example only.

A blowing agent 44 is then positioned within each selected portion 42 on the exposed side of the second sheet 30. The blowing agent 44 may be the same as the blowing agent 26 (FIG. 1) or may be different.

Figure 5:
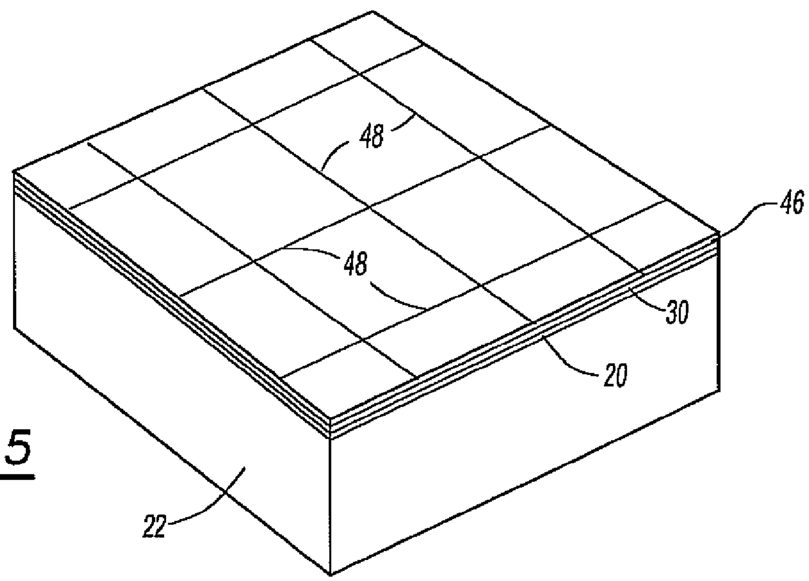
FIG. 5 is a view similar to FIG. 2, but illustrating a modification thereof.

With reference now to FIG. 5, a third sheet 46 is then positioned over the exposed side of the second sheet 30 so that the third sheet 46 covers each of the selected portions 42 defined on the exposed side of the second sheet 30. Thereafter, the second sheet 30 and third sheet 46 are secured together by a friction stir welding, thus forming the friction stir welds 48 which extend entirely around each of the selected portions 42 (FIG. 4) which form a pattern for the final desired metallic part.

Furthermore, although the third sheet 46 has been described as overlying the exposed side of the second sheet 30, it will be understood, of course, that the third sheet 46 optionally may overlie the exposed side of the first sheet 20. In this event, after the first sheet 20 and second sheet 30 are attached together, the resulting structure would be flipped so that the exposed side of the first sheet would face upwardly.

Figure 6:
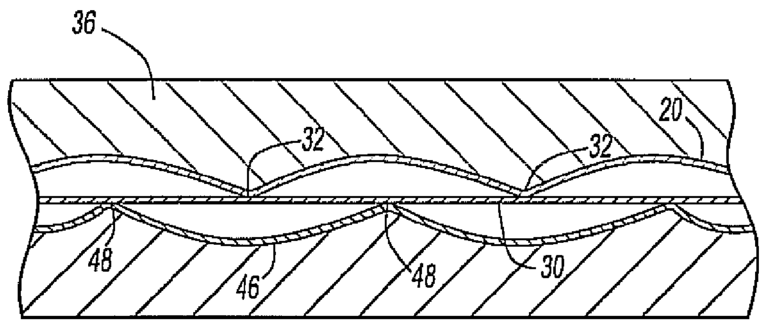
FIG. 6 is a view similar to FIG. 3, but illustrating a modification thereof.

After completion of the three-sheet structure illustrated in FIG. 5, it is optionally placed into the mold 36 and heated to a temperature which exceeds the decomposition temperature of the blowing agent. When this occurs, the blowing agent decomposes, thus releasing hydrogen gas and forming the lattice structure illustrated in FIGS. 5 and 6, in which the patterns on the opposite sides of the structure are offset from each other and interlaced.

From the foregoing, it can be seen that the present invention provides a novel method for forming multi-sheet metallic structures which overcomes the limitations of the previously known methods. In particular, since friction stir welding is utilized to secure the sheets together, the relatively low temperature generated during the friction stir welding process insures against premature decomposition of the blowing agent and allows for greater flexibility of the weld pattern between the sheets. Furthermore, the welds created by friction stir welding are less stronger and more ductile than the previously known thermal welds (,) which is highly desirable during the heating and expansion of the sheets.

Having described our invention, however, many modifications thereto will become apparent to those of skill in the art to which it pertains without deviation from the spirit of the invention as defined by the scope of the amended claims.

We claim:

1. A method for fabricating multi-sheet structures comprising the steps of:

arranging a first sheet on a planar support, placing a blowing agent on at least one selected portion of said first sheet, positioning a second sheet over said first sheet so that said second sheet overlies said at least one selected portion of said first sheet, friction stir welding said first and second sheets together in a continuous pattern which fully encloses said selected portion of said first sheet, and thereafter heating said blowing agent to a temperature sufficient to decompose said blowing agent.

2. The method as defined in claim 1 wherein said first and second sheets each comprise a metallic alloy.

3. The method as defined in claim 2 wherein the metallic alloy comprises aluminum.

4. The method as defined in claim 1 wherein said blowing agent comprises titanium hydride powder.

5. The method as defined in claim 1 wherein said blowing agent comprises magnesium hydride powder.

6. The method as defined in claim 1 wherein said placing step further comprises the steps of placing a blowing agent on a plurality of different selected portions of said first sheet and wherein said welding step further comprises the step of friction stir welding said first and second sheets together in a pattern which encloses each of said selected portion of said first sheet and so that each selected portion is sealed from the other selected portions.

7. The method as defined in claim 1 and further comprising the steps of:

placing a blowing agent on at least one selected portion of an exposed side of either said first or said second sheet after said welding step and prior to said heating step, positioning a third sheet over said exposed side of said first or said second sheet so that said third sheet overlies said at least one selected portion of said exposed side of said first or said second sheet, and friction stir welding said third sheet and the exposed side of said first or said second sheet together in a pattern which encloses said selected portion of said first sheet.

8. The method as defined in claim 7 wherein said selected portion on the exposed side of said first or said second sheet is offset from said selected portion on said first or said second sheet.

* * * * *